United States Patent [19]

Hoshino et al.

[11] Patent Number: 4,683,375

[45] Date of Patent: Jul. 28, 1987

[54] APPARATUS FOR DETECTING A STEERING ANGLE AND A STEERING ANGULAR VELOCITY

[75] Inventors: Shigeru Hoshino; Hiroshi Miyata, both of Toyota, Japan

[73] Assignee: Toyota Jidosha Kabushiki Kaisha

[21] Appl. No.: 883,438

[22] Filed: Jul. 14, 1986

Related U.S. Application Data

[63] Continuation of Ser. No. 574,353, Jan. 27, 1984, abandoned.

[30] Foreign Application Priority Data

Jan. 29, 1983 [JP] Japan .............................. 58-11959[U]

[51] Int. Cl.[4] .............................................. G01D 5/34
[52] U.S. Cl. ................................. 250/231 SE; 116/31; 340/347 P
[58] Field of Search ................... 250/231 SE; 116/31; 324/175; 340/347 P

[56] References Cited

U.S. PATENT DOCUMENTS

| 4,297,573 | 10/1981 | Becchi et al. | 250/231 SE |
| 4,387,299 | 6/1983 | Akiyama | 250/231 SE |
| 4,387,374 | 6/1983 | Wiener | 250/231 SE |

FOREIGN PATENT DOCUMENTS

| 58-4672 | 1/1983 | Japan . |
| 58-183358 | 10/1983 | Japan . |
| 896550 | 5/1962 | United Kingdom . |
| 1417788 | 12/1975 | United Kingdom . |
| 1500111 | 8/1978 | United Kingdom . |
| 2024122 | 1/1980 | United Kingdom . |

Primary Examiner—Edward P. Westin
Attorney, Agent, or Firm—Parkhurst & Oliff

[57] ABSTRACT

An apparatus for detecting a steering angle and a steering angular velocity of a steering mounted in a vehicle. The apparatus has a sensor mounted on a steering column tube, and a disc secured onto the outer periphery of a steering shaft. The steering column tube has a projecting form in which a luminescent element and a light receiving element are provided. The projecting form is designed not to contact with the disc.

10 Claims, 10 Drawing Figures

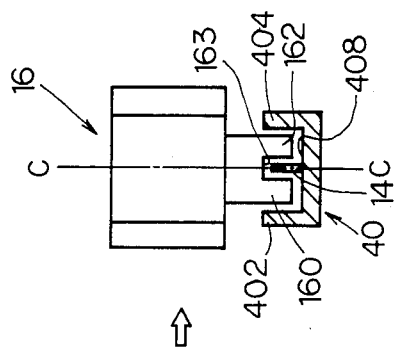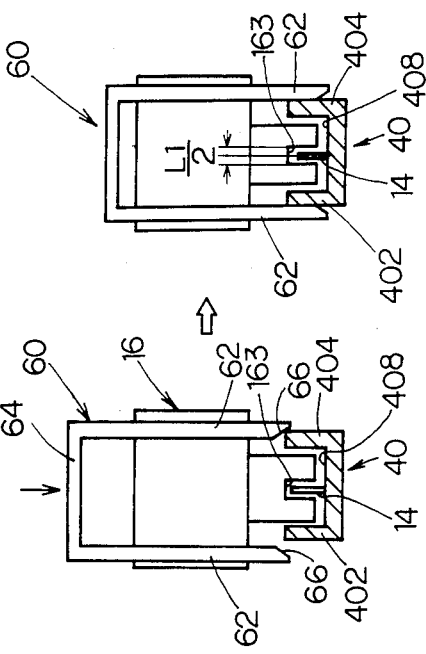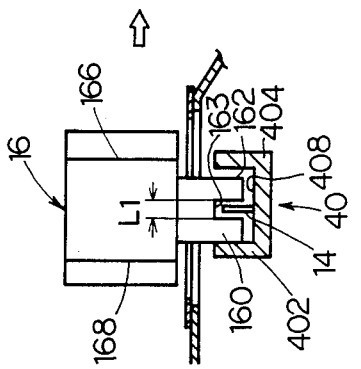

APPARATUS FOR DETECTING A STEERING ANGLE AND A STEERING ANGULAR VELOCITY

This is a continuation of application Ser. No. 574,353, filed Jan. 27, 1984, now abandoned.

BACKGROUND OF THE INVENTION

The present invention relates to an apparatus for detecting a steering angle and an anglar velocity of a steering wheel in a vehicle, and more particularly to a steering sensor for detecting a steering angle and an angular velocity of a steering member.

Heretofore, an apparatus for detecting a steering angle and a angular velocity of a steering member generally included a disc mounted on a steering shaft, and a sensor secured to a steering column tube. The disc is designed to be rotated with the steering shaft, and has a number of small holes which are concentrically located thereon. The sensor has a luminescent element and a light receiving element, which are oppositely located on different axial sides of the disc and are positioned such that light emitted can pass through the holes of the disc and contact the light receiving element. When the steering shaft rotates by a driver's operation, the disc is forced to rotate with the steering shaft. In this condition, the light transmitted from the luminescent element to the light receiving element is interrupted by the rotation of the disc. The degree of the interruption is proportional to the number of rotations of the disc. The degree of the interruption is converted to an electric pulse, and thereafter the steering angle and the steering angular velocity are calculated by the electric pulse. Applicant has also proposed an invention relating to the detailed structure of the sensor and the disc in a separate application.

Known sensors for detecting a steering angle and a steering angular velocity, have been mounted on a gear box or a bearing wheel. This mounting results in the following disadvantages:

(a) It is difficult to assemble accurately the sensor because of the small space provided for mounting the sensor on a gear box or a bearing wheel;
(b) It is difficult to maintain an accurate determination of the amount of revolution of the steering member after an absorbtion of impact energy generated from a collision which has occurred;
(c) If the steering mechanism includes a tilting device, the accuracy of the sensor cannot be maintained while utilizing the tilting device.
(d) It is troublesome to operate a steering wheel; and
(e) Some type of cover must be provided for protecting the sensor from stones, dust or water.

SUMMARY OF THE INVENTION

The present invention was made in view of the foregoing background and to overcome the foregoing drawbacks. It is an object of this invention to provide an apparatus for detecting a steering angle and a steering angular velocity of a steering wheel of a vehicle which overcomes the above enumerated difficulties.

To attain the above objects, an apparatus according to the present invention has a steering wheel operated by a driver, and a steering shaft connected with the steering wheel at an upper end of the shaft. A disc is mounted on and rotatable with the steering shaft. The disc has a plurality of holes, which are concentrically provided therein. The steering shaft is mounted in a steering column tube in a condition that the steering shaft can be rotatable therein. The lower end of the steering column tube is concentrically secured to a lower steering column tube. A sensor, which has a luminescent element and a light receiving element for receiving the luminescence generated by the luminescent element, is mounted on the lower steering column tube.

BRIEF DESCRIPTION OF THE DRAWINGS

The above objects, features and advantages of the present invention will become more apparent from the following description of the preferred embodiment taken in conjunction with the accompanying drawings.

FIGS. 7(a), (b), (c) and (d) are views which illustrate assembling steps of the disc and the sensor according to the present invention.

DETAILED DESCRIPTION OF THE PREFERRED EMBODIMENT

The present invention is described in detail with reference to the accompanying drawings which illustrate different embodiments of the present invention.

Figure 1:
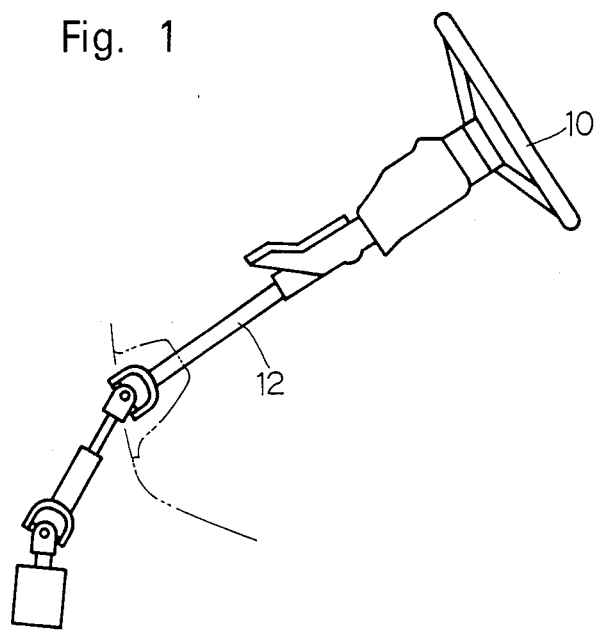
FIG. 1 is a perspective view of a steering which can utilize an apparatus according to the present invention.
Figure 2:
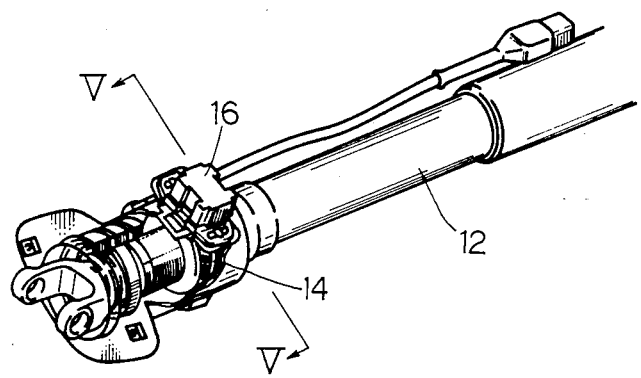
FIG. 2 is a perspective view of a steering shaft having the detecting means according to the present invention applied thereto.
Figure 3:
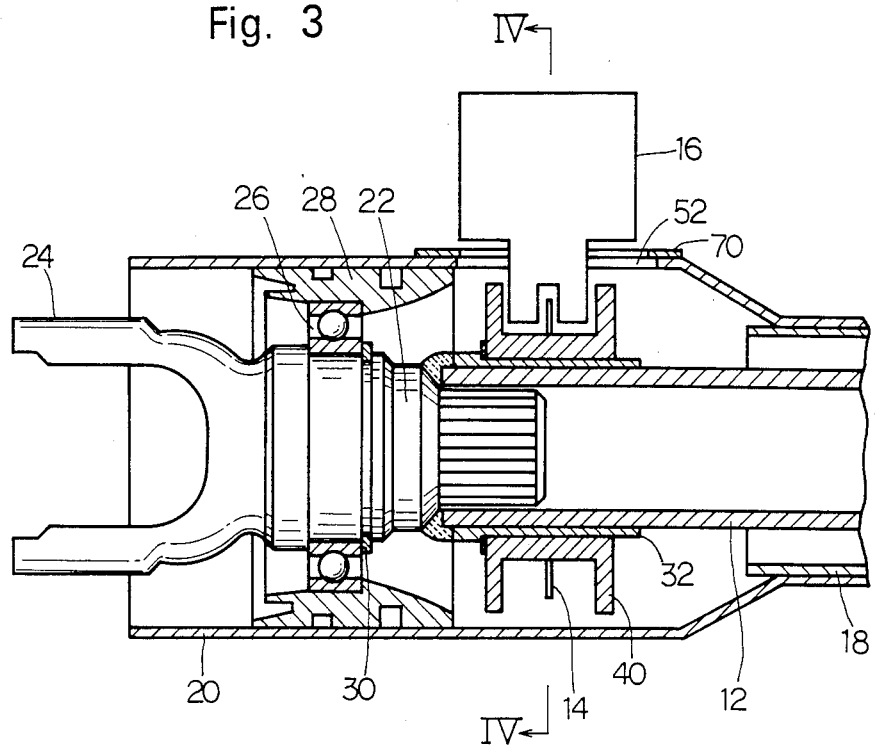
FIG. 3 is an enlarged partial cross-sectional view of the embodiment of the present invention.

FIG. 1 shows a perspective view of a steering device in which an apparatus according to the present invention is utilized. The rotational movement of a steering wheel 10 is transmitted through a steering shaft 12 to wheels (not shown in drawings). The perspective view of the steering shaft according to the present invention is shown in FIG. 2. A disc 14, which includes a plurality of small holes concentrically located thereon (e.g. located at equal radial distances from the center of the disc) is mounted on an outer peripheral portion of the steering shaft 12. A sensor 16 is located at the outer side of the disc 14, and secured to a steering column tube. FIG. 3 shows an enlarged detailed cross-sectional view of the apparatus according to the present invention.

Figure 4:
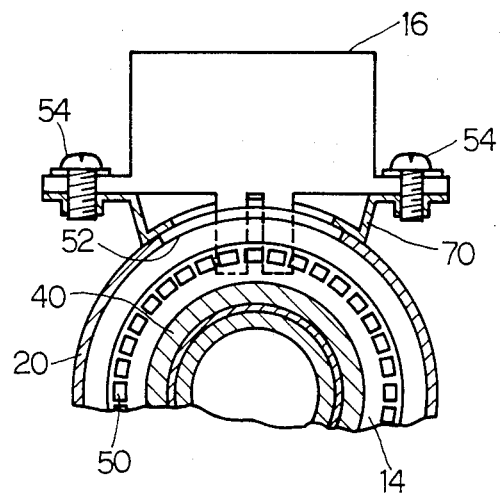
FIG. 4 is a partial cross-sectional view taken along the line IV—IV in FIG. 3.
Figure 5:
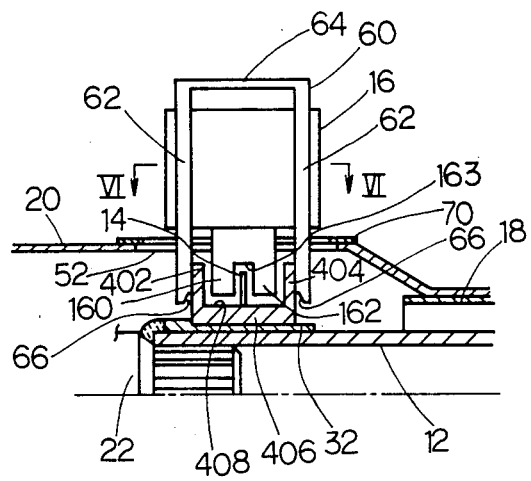
FIG. 5 is a reduced partial cross-sectional view taken along the line V—V in FIG. 2.
Figure 6:
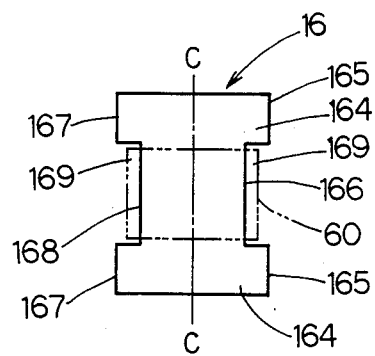
FIG. 6 is a cross-sectional view taken along the line VI—VI of FIG. 5.

A steering column tube 18 extends downward (corresponding to the left direction in FIG. 3), and an enlarged lower column tube 20 is secured to the lower portion of the steering column tube 18. The steering shaft 12 is inserted into the inside of the steering column tube 18. The upper end of the steering shaft 12 is connected with the steering wheel 10. The lower part of the steering shaft 12 extends into the inside of the lower column tube 20. The lower end of the steering shaft 12 is fixed by a welding to a shaft portion 22 of a yoke 24. A lower bearing 26 is provided on an outer peripheral portion of the shaft portion 22 of the yoke 24. The lower bearing 26 is secured through a retainer 28 to the inner face of the steering lower column tube 20. A snap ring 30, provided on the outer periphery of the shaft portion 22 of the yoke 24, prevents the lower bearing 26 from slipping out. A collar 32 is welded to an outer peripheral portion of the steering shaft 12. A holder 40, having a U-shaped cross-sectional form is press fitted onto the outer periphery of collar 32. The holder 40 is to hold the disc 14 thereon. FIGS. 5 and 7 illustrate the detailed structure of the holder 40. The holder 40 has side walls 402 and 404, and a tubular portion 406 which connects with the side walls 402 and 404. The disc 14 is centrally located between the side walls 402 and 404 and is secured to an outer peripheral surface 408 of the tubular portion 406. The disc 14, as shown in FIG. 4, includes a plurality of small holes 50, which are the same shape and are provided on the concentric points of the disc 14 at regular intervals. The enlarged lower column tube 20 has an aperture 52 at a position facing to the holder 40. The aperture 52 is square-like. The lower part of the sensor 16 extends through the aperture 52 into the inside of the enlarged lower column tube 20. The sensor 16 is fastened through screws 54 to a sensor mounting bracket 56. The bracket 56 is fixed to the steering lower column tube 20, as shown in FIG. 4. The sensor 16 has a main portion 164 of a hexagonal cross-sectional shape, a luminescent element 160, and a light receiving element 162, both of which are secured to a bottom face of the main portion 164. The luminescent element 160 and a light receiving element 162 are separated from each other by the distance "$L_1$". The disc 14 is centrally located between the elements 160 and 162 at a point which can be represented by "$L_{1\ 2}$". The sensor 16 has front side faces 165, a front intermediate side face 166, rear side faces 167, and a rear intermediate side face 168 as shown in FIG. 6. The sensor 16 is symmetrical about the center line "C—C" shown in FIG. 6. The distance between the front intermediate side face 166 and the rear intermediate side face 168 is designed to be substantially the same as that defined between the side walls 402 and 404 of the holder 40. The luminescent element 160 and the light receiving element 162 are provided at symmetrical positions about the center line "C—C" of the sensor 16 shown in FIG. 7(d). The luminescent element 160 is designed to have the same thickness in a direction corresponding to the distance "$L_1$", as the light receiving element 162.

The numeral 60 shown in FIGS. 5, 6 and 7 designates a jig for avoiding contact between the thin disc 14 and the luminescent element 160 or the light receiving element 162, while assemblying the sensor 16 in the correct position. The jig 60 has a pair of legs 62, and a bridge portion 64. The pair of legs 62 extend in a substantially parallel manner. The bridge portion 64 connects each of the legs 62 together. The jig 60 is U-shaped in cross-section. The distance between the inner faces of the legs 62 is designed to be same as that defined between the front intermediate side face 166 and the rear intermediate side face 168 of the holder 40. Therefore, because the distance between the front intermediate side face 166 and the rear intermediate side face 168 of the holder 40 is designed to be same as the distance between the outer faces of the side walls 402 and 404. Each of the legs 62 has an inclined tip portion 66 at their respective ends and each of the included tip portions is oppositely inclined. This provides for easy location of the legs 62 around the outer face of the side walls 402 and 404 of the holder 40, providing for the jig 60 to tightly hold the holder 40.

The sensor 16 is assembled onto the column by the following procedure: The sensor 16 is held in a condition providing for contact between the luminescent element 160 and the inner face of the side wall 402 of the holder 40, as shown in FIG. 7(a). Next, the jig 60 is inserted from the top onto the sensor 16, and the legs 62 of the jig 60 fit into grooves 169 defined in the sensor 16, and shown in FIG. 6. One of the inclined tip portions 66 of the legs 62 contacts with an outer peripheral portion of a top end of the holder 40, as shown in FIG. 7(b). Then both legs 62 are downwardly pressed while maintaining contact between the outer surface of the side walls 402 and 404. This results in the center line "C—C" of the sensor 16 becoming coincident with the plane of the disc 14, as shown in FIG. 7(c). The sensor 16 is fastened by the sensor bracket 70 to the lower column tube 20 by screws 54, as shown in FIG. 4. Finally, the jig 60 is removed from the sensor 16 resulting the assembly shown in FIG. 7(d).

When the sensor 16 is assembled onto the steering column, the disc 14 does not forcibly to contact with the luminescent element 160 and the light receiving element 162. Hence, the disc 14 is not bent during the assembly. Accordingly, the unbent sensor 16, can detect the accurate steering angle and the steering angular velocity. Workers can readily assemble the sensor onto the steering column by the use of the jig. Further, the jig can protect the disc from being transformed (i.e. bent) by the reducing undesirable contact with the luminescent element or the light receiving element when the steering column is moved from one position to another during assembly.

While the present invention has been described in its preferred embodiments, it is to be understood that the invention is not limited thereto, and may be otherwise embodied within the scope of the following claims.

What is claimed is:

1. An apparatus for detecting a steering angle and a steering velocity of a steering member mounted on a vehicle, comprising:

a steering wheel;

a steering shaft connected with the steering wheel at an upper end thereof;

a disc mounted on and rotatable with the steering shaft, the disc having a plurality of holes located at equal radial distances from the center of the disc, said disc extending radially outward from the steering shaft;

a steering column tube holding the steering shaft and permitting rotation of the steering shaft therein;

a lower steering column tube secured to a lower end of the steering column tube;

a sensor detachably mounted on the lower steering column tube and having a first extending portion having a luminescent means and second extending portion housing a light receiving means located on axially opposite sides of the disc with said luminscent means and said light receiving means being axially aligned through said disc, said first and second extending portions extending in the radial direction of the steering shaft;

a holder member circumferentially secured onto an outer peripheral portion of the steering shaft, the holder member having a first radial projection and a second radial projection, the disc being centrally located between the first radial projection and the second radial projection; and a jig detachably mounted on said sensor, the jig having a first contacting leg and a second contacting leg, the first and second contacting legs extending to the holder member, the first contacting leg being in contact with the first radial projection of said holder member, the second contacting leg being in contact with the second radial projection of said holder member, whereby the first and second contacting legs of said jig adjust and maintain clearances between the first and second extending portions of the sensor, and the disc.

2. The apparatus of claim 1, wherein the first radial projection of said holder member includes a lower surface and the second radial projection of said holder member includes an upper surface, said lower surface of said first radial projection and said upper surface of said second radial projection facing away from the disc, the first contacting leg of said jig being in contact with the lower surface of the first holder member, the second contacting leg of said jig being in contact with the upper surface of said holder member.

3. The apparatus of claim 1, wherein the holder member comprises an annular portion contacting an outer peripheral portion of the steering shaft, said annular portion extending in the same direction as the steering shaft, and at least one radially projecting portion connected with the longitudinal portion and extending perpendicularly to the annular portion of the holder member.

4. The apparatus of claim 1, wherein the apparatus further comprises a yoke having a shaft portion with an upper portion, the upper portion being welded to a lower portion of the steering shaft.

5. The apparatus of claim 4, wherein a bearing is provided at a position between an outer peripheral portion of the shaft portion of the yoke and an inner surface of the lower tube.

6. An apparatus for detecting a steering angle and an angular velocity of a rotating member, comprising:
- a holder member circumferentially secured onto an outer peripheral portion of the rotating member, the holder member including a first radial projection and a second radial projection with a first interval defined therebetween;
- a disc mounted on and rotatable with the holder member, the disc having a plurality of holes therein located at equal radial distances from the center of the disc, the disc being centrally located between the first and second radial projections of the holder member, whereby a lower half interval is defined between the first radial projection and the disc and an upper half interval is defined between the second radial projection and the disc;
- a tube for rotatably mounting the rotating member therein, wherein the tube does not rotate with the rotating member;
- a lower tube secured to a lower end of the tube;
- a sensor detachably mounted and slidable on the lower tube and having a first extending portion housing a luminescent means and a second extending portion housing a light receiving means axially aligned through the disc, the first and second extending portions being inserted respectively into the lower and upper half intervals, and
- a jig detachably mounted on said sensor, the jig having a first contacting leg and a second contacting leg, the first and second contacting legs extending to the holder member, the first contacting leg being in contact with the first radial projection of said holder member, the second contacting leg being in contact with the second radial projection of said holder member, whereby the first and second contacting legs of said jig adjust and maintain clearances between the first and second radial projections of said holder member, the first and second extending portions of the sensor and the disc, and said disc is prevented from coming in contact with said first or second extending portions.

7. The apparatus of claim 6, wherein the first radial projection of said holder member includes a lower surface and the second radial projection of said holder member includes an upper surface, said lower surface of said first radial projection and the upper surface of said second radial projection facing away from the disc, the first contacting leg of said jig being in contact with the lower surface of said holder member, the second contacting leg of said jig being in contact with the upper surface of the holder member.

8. The apparatus of claim 6, wherein the holder member further comprises an annular portion which contacts an outer peripheral portion of the rotating member and wherein the first and second radial projections are connected to and extend from the annular portion.

9. The apparatus of claim 6, further comprising a yoke having a shaft portion with an upper portion, the upper portion being welded to a lower portion of the rotating member.

10. The apparatus of claim 8, further comprising a bearing provided at a position between an outer peripheral portion of the rotating member and an inner surface of the lower tube.

* * * * *